United States Patent [19]

Peng

[11] Patent Number: 5,784,214
[45] Date of Patent: Jul. 21, 1998

[54] TRANSPARENT WINDOW GLASS HOLDING STRUCTURE FOR OPTICAL SCANNER

[75] Inventor: Henry Peng, Hsinchu, Taiwan

[73] Assignee: Umax Data Systems, Inc., Hsinchu, Taiwan

[21] Appl. No.: 773,725

[22] Filed: Dec. 16, 1996

[51] Int. Cl.⁶ .................................................. G02B 7/02
[52] U.S. Cl. ........................ 359/808; 359/811; 359/818
[58] Field of Search .................................. 359/808, 809, 359/811, 818, 819

[56] References Cited

U.S. PATENT DOCUMENTS 2,746,346  5/1956  Gaire .............................. 359/818
5,097,705  3/1992  Porter ............................. 359/808
5,325,232  6/1994  Lahcanski et al. ................ 359/818
5,548,448  8/1996  Wagner ........................... 359/819

Primary Examiner—Loha Ben
Attorney, Agent, or Firm—W. Wayne Liauh

[57] ABSTRACT

An improvement of transparent window glass holding structure for an optical scanner includes a first rack fixedly disposed in the case. The first rack has a plural number of clamps for holding and gripping the transparent window glass securely without gluing the originals table to the case as does a conventional scanner. The originals table can be easily installed and removed to facilitate the repairs and maintenance of the scanner.

7 Claims, 3 Drawing Sheets

TRANSPARENT WINDOW GLASS HOLDING STRUCTURE FOR OPTICAL SCANNER

BACKGROUND OF THE INVENTION

1. Field of the Invention

This invention relates to an improvement of transparent window glass holding structure for an optical scanner, and, more particularly, to an improved holding structure for the transparent window glass, or the so-called originals table, of a scanner that can be installed or removed rapidly to facilitate repairs and maintenance of the optical scanner.

2. Description of the Prior Art

In a conventional optical scanner, the transparent window glass (also called the transparent "originals table") is usually fixedly glued to the case of the scanner. When there is a need to access the interior of the scanner, such as for repairs or cleaning, the case and the originals table have to be disassembled. It is tedious and troublesome as the originals table has been fixedly glued to the case. The originals table can even be broken if the disassembly work were not done in a careful manner.

SUMMARY OF THE INVENTION

In view of aforesaid disadvantage, it is an object of this invention to provide an improvement of a transparent window glass holding structure for an optical scanner that can facilitate the task of accessing the interior for repairs and maintenance. The improvement disclosed in the presetn invention includes a clamp and a pair of racks for holding the transparent originals table. In the present invention, the originals table is not fixedly glued to the case, but is held by the clamp and racks, and, thus can be easily installed or removed without using tools or disassembling the case. The repairing job thus becomes easier. The originals table and other components are also less susceptible to damages.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
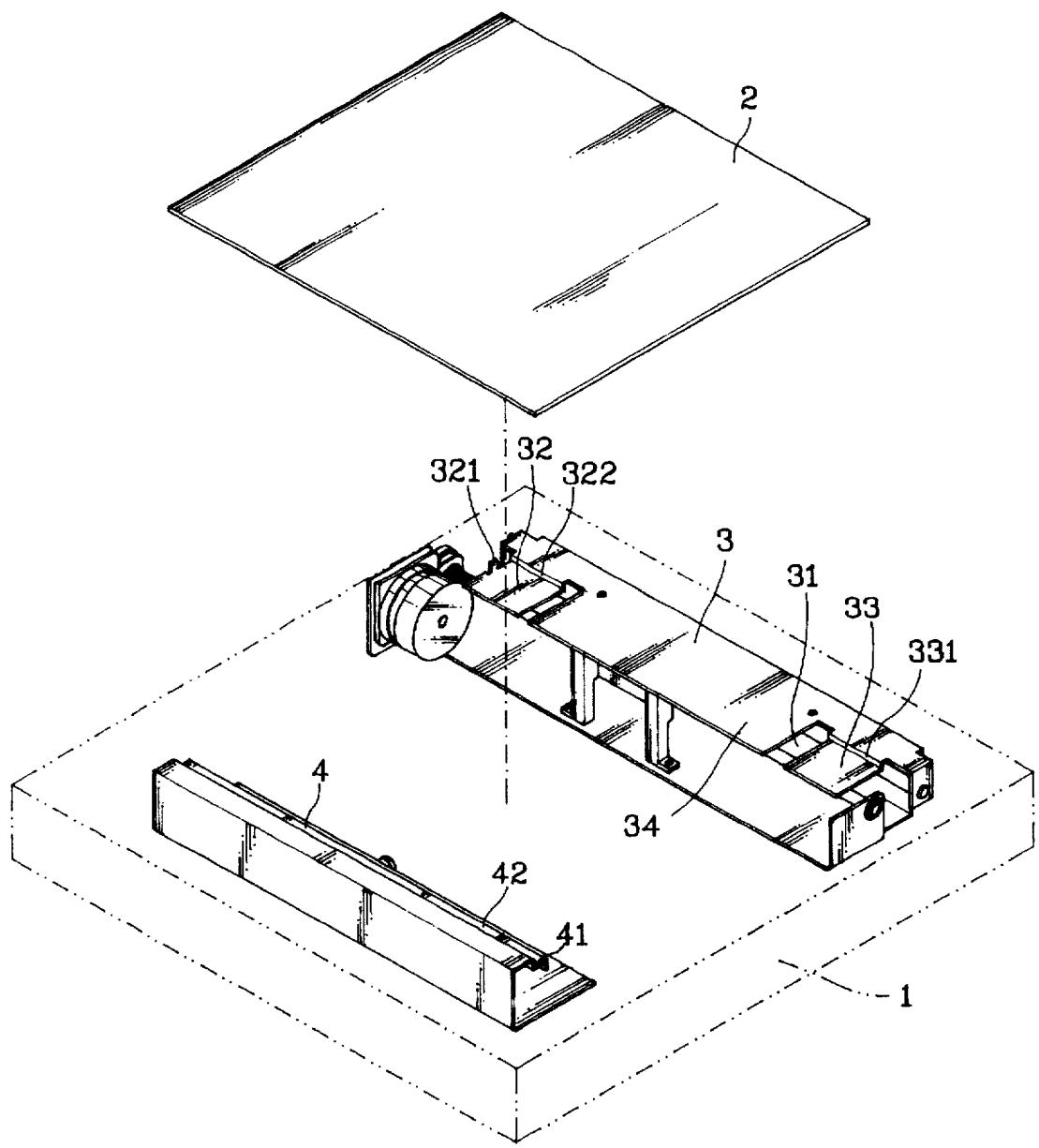
FIG. 1 is an exploded view of the improved transparent window glass holding structure of the present invention.
Figure 2:
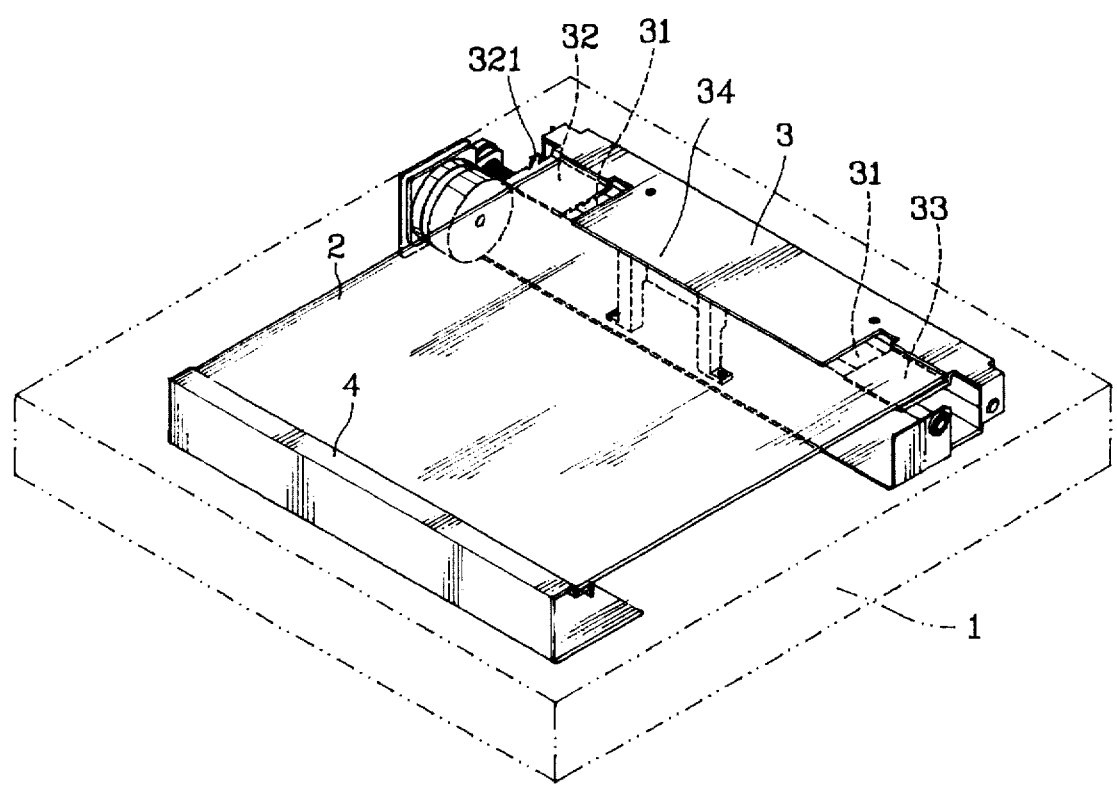
FIG. 2 is a perspective view of the improved transparent window glass holding structure of the present invention.

Referring now to FIGS. 1 and 2, the optical scanner according to this present invention includes a movable cover (not shown in the figures), a light source means (not shown in the figures), a Charge-Coupled Device (CCD, not shown in the figures), an actuating mechanism (not shown in the figures), a case 1, a transparent window glass 2 (also called as the transparent reading platen), a first rack 3 and a second rack 4. The structure and function of the moveable cover, light source means, CCD and actuating mechanism are similar to those of a conventional optical scanner and form no part of this invention, and thus are omitted here.

The main features of this invention include the first rack 3 and the second rack 4, both of which are being screwed respectively on two sides of the case 1 of the scanner. Below the top surface of the first rack 3, there are provided two slots 31. The top surface of the first rack 3 is divided by slots 31 into three clamps, i.e. a left clamp 32, a right clamp 33, and a center clamp 34. The left clamp 32 and the right clamp 33 are first bent vertically downwardly to a distance about the thickness of the originals table, forming bends 322 and 331 respectively, and then projecting horizontally as a flange (also shown in FIG. 3). The center clamp 34 remains horizontal. Therefore clamps 32, 34 and 33 are disposed alternately at two different height levels, and the distance between the two different levels, which is equal to the height of the bends 322 and 331, is the same as the thickness of the originals table 2. Thus, one edge of the originals table 2 can be inserted and held between the gap formed in an offset manner by clamps 32, 33 and 34. At one end of the left clamp 32, there is a vertical stud 321, which serves as boundary stopper to prevent the originals table 2 from slipping outside the first rack 3. The bends 322 and 331 of the first rack 3 serve as another boundary for the originals table 2 in another direction.

The second rack 4 is substantially an L-shaped bar which has a vertical bend 41 and a horizontal flange 42 for holding another edge of the originals table 2.

Figure 3:
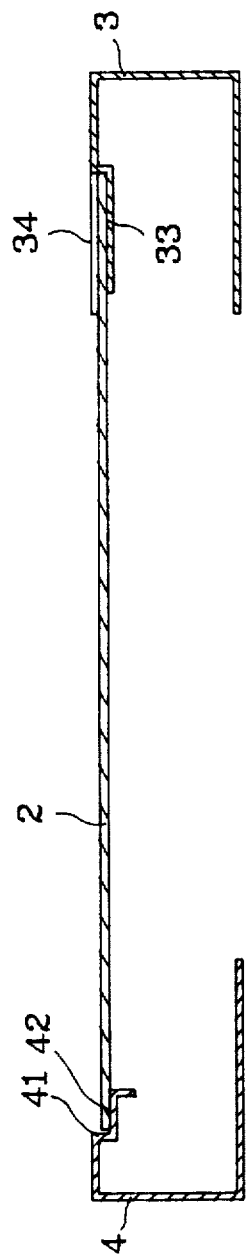
FIG. 3 is a sectional view of the improved transparent window glass holding structure of the present invention in use state.

FIG. 3 shows this invention when it is in actual use. For installation, one edge of the originals table 2 is inserted and slipped into the offset gap formed by the center clamp 34 and the left and right clamps 32, 33, while a lateral edge of the originals table 2 is held against the vertical stud 321. Another end of the originals table 2 is then laid down on the flange 42 of the second rack 4. The originals table 2 thus can be held securely between the first and the second racks.

To remove the originals table 2 from the scanner, the edge being held on the second rack 4 is lifted slightly. Then, the originals table 2 is gripped and pulled out from the first rack 3.

As described above, the transparent window glass according to the present invention is not fixedly glued to the case, but can be removed easily and readily whenever there is a need for accessing the interior of the scanner for repairs or maintenance.

It thus can be seen that the object of this invention is successfully attained.

Many changes and modifications in the above described embodiment of the invention can, of course, be carried out without departing from the scope thereof, such as the number of the clamps may be more than three. Therefore all the changes and modifications without departing from the spirit of this invention should be included in the scope of this invention.

I claim:

1. An improvement of a transparent window glass holding structure for an optical scanner, comprising:

a first rack located at one side of a scanner case for holding one edge of a transparent window glass including a plurality of clamps formed on the top surface of the first rack, wherein the clamps are disposed alternately at two different vertical levels, further wherein the distance of the two different vertical levels is the same as the thickness of the transparent window glass so as to allow one edge of the transparent window glass to be firmly but removably inserted thereinto; and a second rack for holding another edge of the transparent window glass.

2. An improvement of transparent window glass holding structure for an optical scanner of claim 1, wherein the clamps are respectively segmented into left, center and right clamps by two horizontally disposed slots also formed on the first rack.

3. An improvement of transparent window glass holding structure for an optical scanner of claim 2, wherein said left and right clamps have respectively a vertical bend downward to a distance of the transparent window glass thickness and have a horizontal flange extending from the bottom edge of the bend.

4. An improvement of transparent window glass holding structure for an optical scanner of claim 3 further having a vertical stud at one end of the left clamp for enabling rapid positioning of the transparent window glass.

5. An improvement of transparent window glass holding structure for an optical scanner of claim 4, wherein the second rack is substantially an L-shaped bar having a vertical bend and a horizontal flange for holding the transparent window glass.

6. An improvement of transparent window glass holding structure for an optical scanner of claim 2 further having a vertical stud at one end of the left clamp for enabling rapid positioning of the transparent window glass.

7. An improvement of transparent window glass holding structure for an optical scanner of claim 1, wherein the second rack is substantially an L-shaped bar having a vertical bend and a horizontal flange for holding the transparent window glass.

* * * * *